United States Patent [19]

Broadman et al.

[11] 4,109,533

[45] Aug. 29, 1978

[54] TACHOMETER

[75] Inventors: Richard J. Broadman, W. Simsbury; Richard D. May, Weston, both of Conn.

[73] Assignee: Jones Instrument Corporation, Stanford, Conn.

[21] Appl. No.: 754,401

[22] Filed: Dec. 27, 1976

[51] Int. Cl.² .............................................. G01P 3/18
[52] U.S. Cl. ...................... 73/498; 73/530; 73/531; 116/129 R
[58] Field of Search .................. 73/498, 530, 531, 534; 116/129 R, 116; 74/89.2

[56] References Cited

U.S. PATENT DOCUMENTS

| 863,014 | 8/1907 | Becherer | 73/498 X |
|---|---|---|---|
| 1,330,120 | 2/1920 | Jones | 73/498 |
| 1,929,537 | 10/1933 | Schweisthal | 73/498 |
| 3,295,376 | 1/1967 | Thorner | 73/490 |
| 3,315,534 | 4/1967 | Whippo | 74/89.2 |

FOREIGN PATENT DOCUMENTS 45,025  8/1908  Switzerland .................. 73/530

*Primary Examiner*—James J. Gill
*Attorney, Agent, or Firm*—James & Franklin

[57] ABSTRACT

Apparatus for deflecting a pointer in proportion to the rotational speed of a shaft comprises a support, a governor mounted on the support, an indicator mounted on the support and an angled calibrating lever pivotally mounted on the support and connecting the governor to the indicator. The governor includes an input member adapted to be operably connected to the shaft for rotation therewith and an output member movable in a given direction (typically parallel to the axis of shaft rotation) to a degree generally related to the rotational speed of the shaft. The indicator includes a drum, a pointer operably connected to the drum for movement therewith, and a flexible member at least partially wound about the drum so that the drum is rotated by the unwinding of the flexible member therefrom. The angled calibrating lever has one leg bearing against the output member for motion therewith and the other leg secured to a portion of the flexible member for unwinding the flexible member from the drum.

In order that the deflection of the pointer be in close proportion to the rotational speed of the shaft, means are provided for compensating for the deviation from proportionality of the degree of movement of the output member to the rotational speed of the shaft. The compensating means may be either means for adjusting the angle formed by the legs of the calibrating lever or a non-linear peripheral contour of the drum on which the flexible member is wound.

31 Claims, 8 Drawing Figures

TACHOMETER

BACKGROUND OF THE INVENTION

The present invention relates to apparatus for deflecting a pointer in proportion to the rotational speed of a shaft, and more particularly to tachometers, speedometers and the like of high accuracy.

Apparatus for deflecting a pointer in proportion to rotational speed of a shaft is found in many common devices such as tachometers, speedometers and the like. Most such apparatus operate on a governor principle. In such systems a governor spindle is connected to the rotating shaft for rotation therewith. A plurality of weights spaced around and from the circumference of the governor spindle are operably connected at one end to the governor spindle by means of a first spider, the hub of the first spider being mounted at a fixed point along the length of the governor spindle for rotation therewith, so that the weights rotate at the same speed as the governor spindle. The weights are connected at the other end thereof to a second spider which is also mounted on the governor spindle, but the second spider is displaceable axially along the length of the governor spindle. A governor spring acting along the governor spindle axis biases the first and second spiders apart.

Rotation of the shaft whose rotational speed is to be measured is transmitted to the first spider and thence to the weights. The rotation of the weights about the governor spindle creates a centrifugal force which causes the weights to move outwardly from the governor spindle. The centrifugal force acting on each weight is balanced by the governor spring which tends to maintain the weights close to the governor spindle. As the rotational speed of the shaft increases, the centrifugal force acting on the weight grows larger ($F = Mrw^2$) and the weights move outwardly from the governor spindle. The outward movement of the weights draws the first and second spiders together by causing the second spider to slide axially along the governor spindle towards the first spider, thereby compressing the governor spring. The axial motion of the second spider ceases when the governor spring force causing separation of the spiders is equal to the axial component of the centrifugal force tending to draw the spiders together. Thus, the governor translates the rotational speed of the shaft into an axial movement along the governor spindle axis which is generally proportional to the rotational speed of the shaft. The axial movement is then translated into a pivotal movement of a pointer against a stationary dial, for example, by a rack and pinion arrangement.

It is generally desirable to have equal unit increments of the quantity to be measured (e.g. rpm, mph, etc.) equidistantly spaced around the circumference of the dial against which pointer movement is to be measured for accuracy. This means that the pointer movement must be directly proportional to the rotational speed of the shaft. However, as the centrifugal force acting on the weights varies as the square of the rotational speed of the shaft, the translational motion of the second spider, and hence the pointer motion, is not linearly proportional to the rotational speed of the shaft. Thus tachometers of the construction described above provide readings with a built-in error factor, the error factor generally increasing with the rotational speed of the shaft.

Accordingly, it is an object of the present invention to provide a tachometer or similar device in which pointer movement is linearly proportional to the rotational speed of the shaft.

It is also an object to provide such a device containing means to compensate for the lack of linear proportionality between the translational movement of the second spider and the rotational speed of the shaft.

It is a further object to provide such a device which is easily adaptable for measuring a broad range of rotational speeds.

Another object is to provide such a device which is of simple, rugged and inexpensive construction.

SUMMARY OF THE INVENTION

It has now been found that the above and related objects of the present invention are obtained in apparatus for deflecting a pointer in proportion to the rotational speed of a shaft comprising governor means mounted on a support and including an input member adapted to be operably connected to the shaft for rotation therewith and an output member movable in a given direction to a degree generally related to the rotational speed of the shaft. Indicator means are provided including a drum rotatably mounted on the support, a pointer operably connected to the drum for movement therewith, and a flexible member at least partially wound about the drum, the drum being rotated by the unwinding of the flexible member therefrom. Means are also provided to operably connect the output member and the flexible member, thereby to translate the motion of the output member into the unwinding of the flexible member from the drum.

Means are also provided for compensating for the deviation from linear proportionality of the movement of the output member to the rotational speed of the shaft. In one embodiment the compensating means comprises a nonlinear peripheral contour of the drum, the contour being configured and dimensioned so that the rotation of the drum is closely proportional to the rotational speed of the shaft. In other words, the non-linear contour of the drum compensates for a lack of linear proportionality between the output translational motion of the governor and the input rotational motion to the governor. In another embodiment the connecting means comprises an angled calibrating lever having a vertex pivotally mounted on the support with one leg bearing against the governor output member for movement therewith and the other leg secured to a portion of the flexible member for unwinding the flexible member from the drum. In this case the compensating means comprises means for adjusting the effective angle formed by the legs of the angled calibrating lever, whereby the movement of the flexible member is rendered closely proportional to the rotational speed of the shaft.

BRIEF DESCRIPION OF THE DRAWING

FIG. 8 is a fragmentary front elevation view, partially in cross-section, taken along the line 8—8 of FIG. 5.

DETAILED DESCRIPTION OF THE PREFERRED EMBODIMENTS

Figure 1:
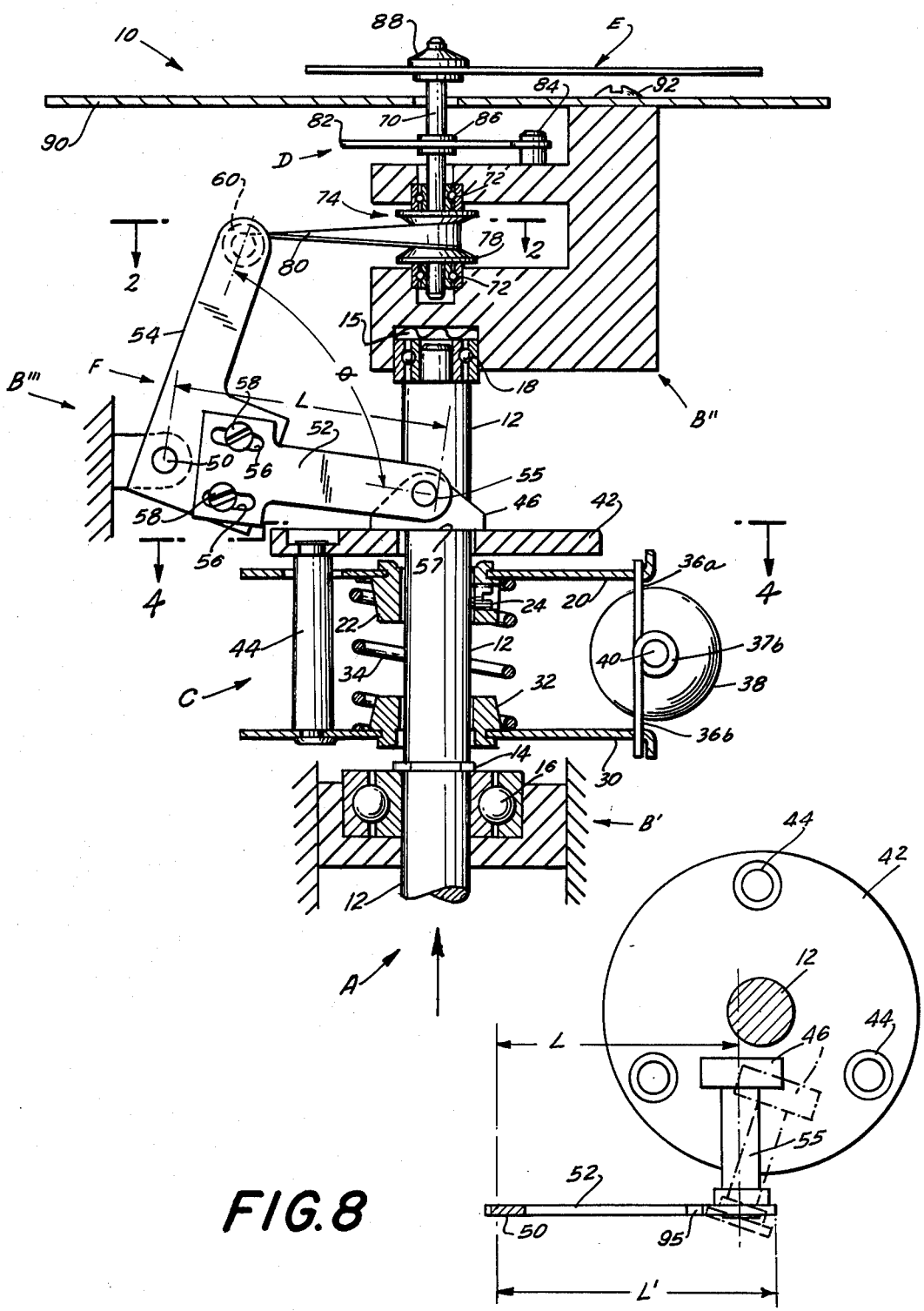
FIG. 1 is a top plan view, partially in cross-section, of a first embodiment of the present invention.

Referring now to the drawings, and in particular to FIGS. 1-4 thereof, therein illustrated is a first embodiment of the present invention comprising apparatus for deflecting a pointer in proportion to the rotational speed of a shaft, for example, a tachometer generally designated 10. Briefly, the tachometer 10 is adapted to determine the rotational speed of the shaft A and comprises a support B, governor means C, indicator means D including a pointer E, and an angled calibrating lever F pivotally mounted on the support B. The governor means C converts the rotational speed of the shaft A into a translational motion parallel to the axis of rotation of the shaft A. The calibrating lever F converts the translational motion output of the governor means C into a rotational motion of the pointer E of the indicator means D which is closely proportional to the rotational speed of the shaft A.

More particularly, the governor means C comprises a governor spindle 12 which is connected to a governor input member or shaft A for rotation therewith by means of a conventional flexible coupling (not shown). The governor spindle 12 is supported by being suitably journaled in support B' by bearing 16 at the rear end and in support B" by bearing 18 at its front end. Axial motion of governor spindle 12 towards the rear and front is prevented by retaining ring 14 and spring washer 15, respectively.

A front spider 20 is mounted on the governor spindle 12 for rotation therewith, the hub 22 of the front spider 20 being fixed at a given position along the length of the governor spindle 12 by means of a setscrew 24. A rear spider 30 is mounted on the governor spindle 12 behind the front spider 20; however, unlike front spider 20, the hub 32 of rear spider 30 is slidably mounted on governor spindle 12 so that rear spider 30 is free for translational motion along the axis of governor spindle 12. A compression spring 34 is disposed about the governor spindle 12 with one end thereof bearing forwardly against the rear surface of the front spider 20 and the other end bearing rearwardly against the front surface of the rear spider 30. As the disposition of the front spider 20 relative to the governor spindle 12 is fixed, the action of spring 34 is to bias the rear spider rearwardly.

The spiders 20 and 30 are connected to each other by means of a rigid U-shaped front link 36a, a weight 38 and a rigid U-shaped rear link 36b. For purposes of clarity of illustration, only a single pair of links 36 and its corresponding weight 38 is illustrated; however, in practice there are a plurality of link pairs 36, typically three equidistantly spaced about the circumference of the spiders 20,30, with each link pair 36 carrying a corresponding weight 38. It will be noted that each weight 38 is of cylindrical configuration and terminates in a pair of stub shafts 40, each stub shaft 40 being encircled by a loop 37a on the end of one leg of a front link 36a and a loop 37b on the end of one leg of a rear link 36b.

The ends of the spiders 20,30 pass between the sides of each link 36 and turn outwardly from weight 38 beyond the intermediate portion of each link 36 to preclude the links 36 from falling off the spider 20,30. The mass of weights 38 and the strength of governor spring 34 are selected to provide, for the anticipated range of rotational speed, an axial deflection of rear spider 30 which is within a desired range — i.e., produces the desired range of deflection of pointer E.

Figure 4:
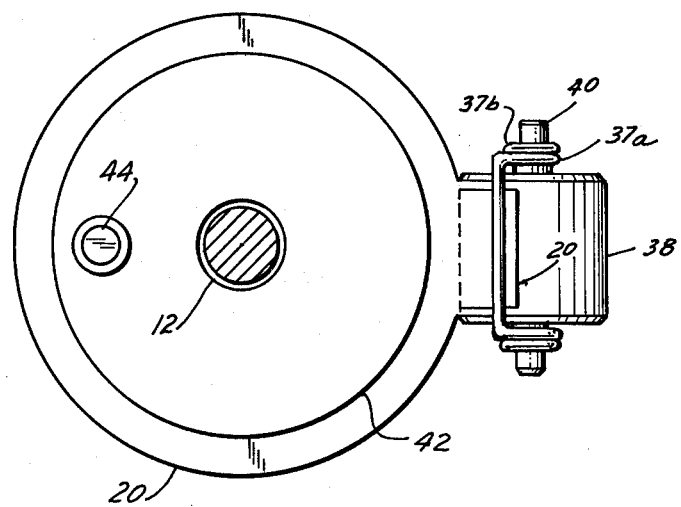
FIG. 4 is a front elevation view, partially in cross-section, taken along the line 4—4 of FIG. 1.

Referring now to FIGS. 1 and 4, a governor output member of disk 42 is mounted about the governor spindle 12 forwardly of front spider 20. A post 44 passes through an aperture in front spider 20 and has its front and rear ends locked into disk 42 and rear spider 30, respectively, for both translational and rotational motion therewith. For the purposes of clarity of illustration, only a single post 44 is illustrated; however, in practice there are a plurality of posts 44, typically three equidistantly spaced about the circumferences of the spiders 20,30 (as illustrated in FIG. 8).

The angled lever F is pivotally mounted adjacent its vertex at 50 on support B'''. The lever F includes a rearwardly extending leg 52 and a forwardly extending leg 54, the free ends of the legs 52,54 defining therebetween an effective angle $\theta$ having a vertex at 50. A shoe 46 has a forward portion pivotally mounted on a post 55 (see FIG. 8) secured to the free end of leg 52 and a rearward portion defining a contact area 57 bearing against the front surface of disk 42, as is further explained below. The effective length L of leg 52 is thus the distance along the axis of leg 52 separating two planes transverse to such axis, one plane passing through the pivot point 50 and the other plane passing through the center of the contact area 57. In one embodiment (to be discussed below) the lever F is of one piece unitary construction with legs 52,54 defining a fixed effective angle $\theta$ selected from the range of 45°-90°. However, in the preferred embodiment illustrated in FIGS. 1-4 lever F is not a unitary, one-piece construction, but includes means for varying the effective angle $\theta$ and length L. To this end the vertex end of leg 52 defines a pair of parallel axially extending slots 56, the leg 52 being connected to the leg 54 by means of a pair of screws 58 passing through slots 56 and engaging leg 54. The screws 58 may be loosened to permit the free end of leg 52 to be moved both transversely relative to leg 54 until the centerlines of legs 52,54 define the desired effective angle $\theta$ therebetween and longitudinally relative to 50 until the desired effective length L of leg 52 is obtained, at which point the screws 58 may be tightened to fix the angle $\theta$.

The free end of leg 54 supports a capstan thereon. The capstan 60 is secured to the leg 54 by a locking arrangement 62 including a spring washer 63 and retaining ring 64 which normally precludes rotation of the capstan 60 relative to leg 54 under forces typically encountered in tachometer operation, but permits such rotation in a given instance; for example, when an appropriate tool is inserted into the slot 65 in the head thereof and a force higher than that typically encountered in tachometer operation is applied.

Figure 2:
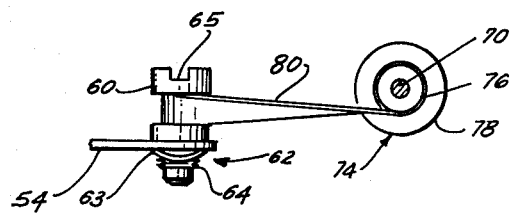
FIG. 2 is a front elevation view, partially in cross-section, taken along the line 2—2 of FIG. 1.
Figure 3:
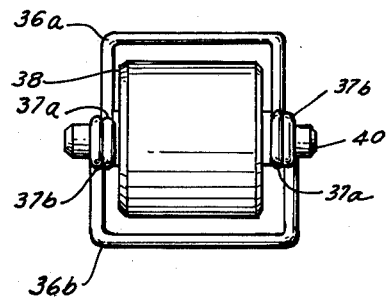
FIG. 3 is a side elevation view showing a weight and its linkage to the spiders.

Referring now to FIGS. 1 and 2, the indicator means D includes an indicator spindle 70 journaled to support B" by means of bearings 72. Mounted on the rear end of the indicator spindle 70 is a drum, generally designated 74, having a cylindrical intermediate portion 76 and outwardly flared ends 78. A flexible ribbon 80 has one end thereof secured to a point on drum surface 76 and the other end thereof secured to a point on the capstan 60 so that, as the distance between capstan 60 and drum 74 increases (due to a counterclockwise rotation of lever F as shown in FIG. 1), the ribbon 80 is forced to unwind from drum 74, thereby causing rotation of drum 74 in a first direction.

A hairspring 82 has one end thereof secured to support B" by means of a lug 84 and the other end thereof secured to the indicator spindle 70 at point 86 in such a manner as to bias the indicator spindle 70 for rotation in a second direction opposite the aforementioned first direction. Thus, hairspring 82 tends to cause rotation of indicator spindle 70 (and hence drum 74) in a direction causing winding of ribbon 80 upon drum 74. Winding of ribbon 80 on drum 74 causes lever F to pivot in such manner (clockwise as shown in FIG. 1) as to draw capstan 60 towards drum 74 and the free end of leg 52 towards the disk 42. As shoe 46 is connected to the free end of leg 52 at point 55, it will be noted that hairspring 82 has the effect of causing shoe 46 to constantly bear against the forward surface of disk 42. Thus any translational movement of disk 42 is reflected in a corresponding translational movement of the free end of leg 52.

Indicator means D additionally includes a pointer E fixed to the front end of indicator spindle 70 at a point 88 for rotation therewith and a dial 90 mounted on support B" by means of screws 92. The front of dial 90 may contain equidistantly spaced along an arc thereof various indicia (not shown) reflecting equal increments of the rotational speed of shaft A, for example, revolutions per unit of time or distance traveled per unit of time.

While indicator spindle 70 and governor spindle 12 have been illustrated as aligned, obviously this is not a requirement of the present invention.

Prior to use, the tachometer 10 is adjusted so that it will produce the most accurate readings for the range of rotational speed to be measured. This is accomplished by loosening screws 58 of lever F, positioning the legs 52,54 to define a desired angle $\theta$ and length L, and retightening the screws 58. The tachometer is then zeroed so that the pointer E is aligned with the indication on dial 90 representing a zero rotational speed. This is accomplished by inserting an appropriate tool in the slot 65 of capstan 60 and forcibly rotating the capstan 60 in an appropriate direction until the desired result is obtained. It will be noted that rotation of the capstan 60 has the same effect on pointer E as does a variation in the separation of capstan 60 and drum 74.

In use, the rotation of shaft A is transmitted to governor spindle 12, and thus to front spider 20 which is fixed to governor spindle 12 for rotation therewith. Rotation of front spider 20 acts through front links 36a, weight 38, rear links 36b, rear spider 30 and posts 44 to cause rotation of disk 42 therewith. As the weights 38 are carried by links 36, the weights 38 rotate with shaft A, thus creating a centrifugal force acting on each weight. As the rotational speed of the shaft increases, the centrifugal force acting on the weights 38 increases according to the formula $F = Mrw^2$ and the weights 38 move outwardly from the governor spindle 12 carrying with them the adjacent ends of links 36. As the weights 38 move outwardly the effective length of each link pair 36 decreases and rear spider 30 is drawn closer to front spider 20. As rear spider 30 moves closer to front spider 20, it compresses governor spring 34 until the axial component due to the outward movement of weights 38 is balanced by the extension force of governor spring 34.

As rear spider 30 moves forwardly (i.e., closer to front spider 20), it carries with it posts 44, disk 42 and shoe 46. Forward displacement of shoe 46 causes a pivoting (counterclockwise, as shown in FIG. 1) of lever F about point 50. As lever F pivots, the separation between capstan 60 and drum 74 increases, thus causing ribbon 80 to unwind from the drum 74. As ribbon 80 unwinds from drum 74, drum 74 rotates and carries with it indicator spindle 70 and pointer E, which then moves into alignment with an indicator of higher rotational speed.

Conversely, as the rotational speed of shaft A decreases, the rotational speed of governor spindle 12, front spider 20, front links 36a, weights 38, and rear links 36b decreases. As the rotational speed of weights 38 about governor spindle 12 decreases, the centrifugal force acting on weights 38 decreases and rear spider 30 retreats from front spider 20 under the influence of governor spring 34. As rear spider 30 retreats, it carries with it posts 44 and disk 42, thus enabling a rearward motion on the part of shoe 46 under the influence of hairspring 82 acting through indicator spindle 70, drum 74, flexible ribbon 80, capstan 60 and lever F. Naturally, as indicator spindle 70 rotates under the influence of hairspring 82 it causes pointer E to become aligned with an indicator of lower rotational speed.

It will be noted that where equal increments of rotational speed are equidistantly spaced about dial 90, it is necessary that the rotation of pointer E be linearly related to the rotational speed of shaft A. However, since the centrifugal force acting on the weights 38 varies as the square of rotational speed, the pointer movement would not vary linearly with the rotational speed if movement of the pointer E were directly proportional to the translational motion of disk 42. Thus it is necessary to provide some compensating mechanism intermediate disk 42 and pointer E.

Figure 7:
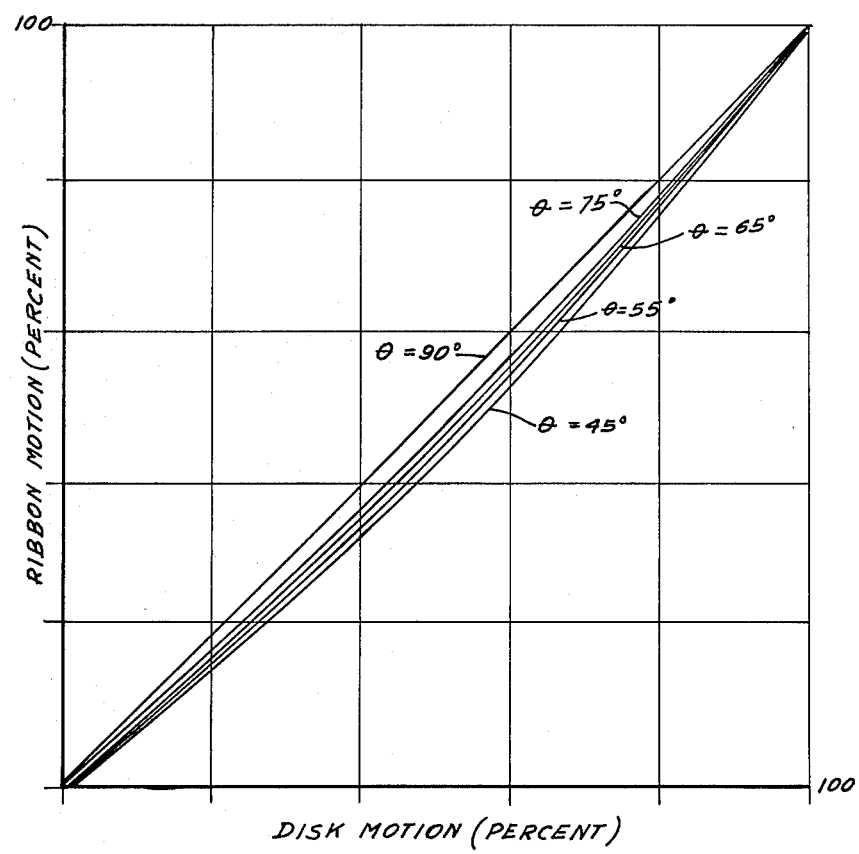
FIG. 7 is a graph showing a correlation of ribbon motion as a function of disk motion for various angles of the calibrating lever.

In the first embodiment illustrated in FIGS. 1-4 and described above, the compensating mechanism is an adjustably angled lever F. As the angle $\theta$ is varied between 45° and 90°, the motion of the ribbon 80 (and hence pointer E) is not linearly responsive to the translational motion of disk 42 (and hence shoe 46). Where $\theta$ equals 90° so that the arms 52,54 of lever F form an effective right angle with respect to the pivot point 50, the ribbon motion varys linearly with the translational disk motion (as indicated by the 45° line of FIG. 7). However, as one decreases the angle $\theta$, the ribbon motion varies non-linearly with the translational disk motion, the exact relationship being shown in the curves of FIG. 7. As the deviation from proportionality of the ribbon motion: translational disk motion function is almost an exact opposite of the deviation from proportionality of the translational disk motion: shaft rotational speed function, it is within the competence of one skilled in the art to select an angle $\theta$ such that the ribbon: disk deviation substantially cancels out the disk: shaft deviation. Thus appropriate selection of an angle $\theta$ for the adjustably angled lever F (and this may be done in situ in the tachometer) enables the tachometer of the present invention to be highly accurate — that is, enables the rotation of the pointer E to be closely proportional to the rotational speed of shaft A.

Figure 5:
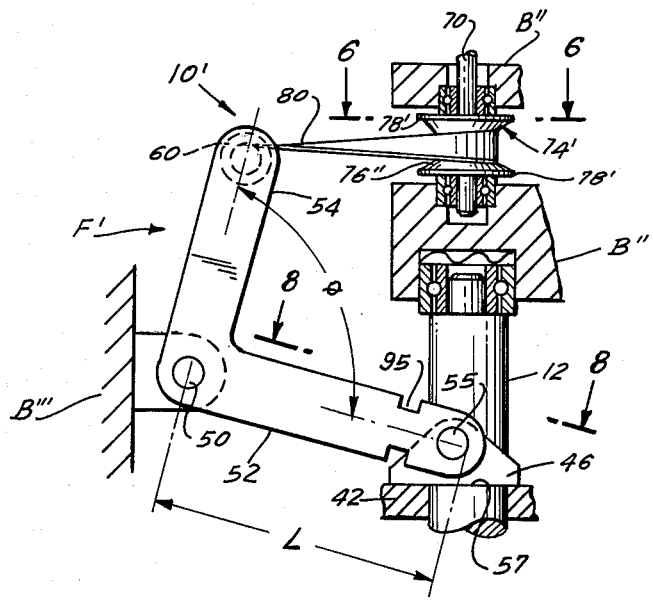
FIG. 5 is a top plan view, partially in cross-section, of a second embodiment of the present invention.
Figure 6:
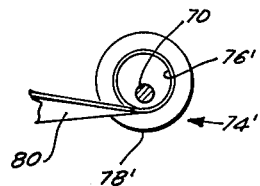
FIG. 6 is a fragmentary front elevation view, partially in cross-section, taken along the line 6—6 of FIG. 5.

A second embodiment of the present invention employs a fixed angle lever and utilizes another means of compensating for the lack of linear proportionality between disk translational motion and the rotational speed of shaft A. Referring now to FIGS. 5, 6 and 8, therein illustrated is a second embodiment 10' utilizing a fixed angle lever F' wherein the legs 52 and 54 define an effective angle $\theta$ therebetween of 45° to 90° (90° as illustrated). Tachometer 10' utilizes as its compensating means the drum 74' comprising outwardly flared ends 78' and an intermediate portion 76' about which one end of ribbon 80 is wound. The drum intermediate portion 76 has a non-linear contour, the contour deviating from a cylinder as one proceeds about the periphery of the intermediate portion 76'. It is within the competence of one skilled in the art to determine an appropriate contour which, for a given range of rotational speeds, provides satisfactory compensation for the lack of proportionality of translational disk motion to shaft rotation.

Just as adjustably angled lever F of the first embodiment includes means for adjusting the effective length L of its leg 52 (to compensate for inevitable variations from governor to governor in the strength of spring 34, the masses of weights 38, the diameters of spiders 20, 30, etc.), the fixed angle lever F' of the second embodiment includes means for adjusting the effective length L of its leg 52. To that end, leg 52 is provided with a section 95 of reduced cross section to facilitate bending of the free end of leg 52, such bending resulting in a variation in the disposition of the contact area 57 between shoe 46 and disk 42, and hence a corresponding variation in the effective length of leg 52. For example, as illustrated in FIG. 8, the effective length of arm 52 may be changed from length L to length L' by a bending of the free end of arm 52 from its solid line position to its phantom line position.

The flexible member 80 may be formed of any material which combines a high level of flexibility (so it can smoothly wrap around drum 74 without setting) and a high level of dimensional stability along its longitudinal axis under the range of stress, humidity and temperature in variations to which it will be subjected in use. A preferred material is an axially reinforced flexible plastic strip in which the reinforcement provides the plastic with the desired dimensional stability without unduly stiffening it. Typical metal wires are unsuitable as the flexible member as they must be so thin to provide the desired level of flexibility that they are hard to handle and tend to break under stress.

To summarize, the present invention provides a tachometer of novel construction utilizing an angled lever, a flexible member and a drum to convert the translational motion of a governor output member to a pointer. In the linkage between the governor output member and the pointer either or both of two compensating mechanisms may be utilized to compensate for the deviation from direct proportionality of the output member translational motion to the shaft rotational speed.

Now that the preferred embodiments of the present invention have been shown and described in detail, various modifications and improvements thereon will become readily apparent to those skilled in the art. For example, the principles of the present invention may be incorporated in apparatus for deflecting a pointer in proportion to the magnitude of a physical variable other than the rotational speed of a shaft — e.g., a pressure gauge in which the physical variable is pressure. In such a pressure gauge the governor means would be replaced simply by a responsive member mounted on the support and movable in a given direction to a degree generally related to the magnitude of the pressure to be measured. Accordingly, the spirit and scope of the present invention is limited only by the appended claims, and not by the foregoing disclosure.

We claim:

1. Apparatus for deflecting a pointer in proportion to the rotational speed of a shaft comprising:
   (A) a support;
   (B) governor means mounted on said support including an input member adapted to be operatively connected to the shaft for rotation therewith and an output member movable in a given direction to a degree generally related to the rotational speed of the shaft;
   (C) indicator means including a drum rotatably mounted on said support, a pointer operatively connected to said drum for movement therewith, and a flexible member at least partially wound about said drum, said drum being rotated by the unwinding of said flexible member therefrom; and
   (D) an angled lever pivotably mounted on said support with one leg operatively bearing on said output member for motion therewith and the other leg secured to a portion of said flexible member for unwinding said flexible member from said drum, the effective angle defined by said legs being manually adjustable for calibration purposes but being fixed during normal operation of said apparatus.

2. The apparatus of claim 1 wherein said flexible member comprises an axially reinforced plastic strip.

3. The apparatus of claim 1 wherein said governor means comprises first and second spider means, said first spider means being fixedly mounted on and operatively connected to said input member for rotation therewith, said second spider means being both slidably and rotatably mounted along the length of said input member on one side of said first spider means; weights operatively connecting said second spider means to said first spider means for rotation therewith; spring means biasing apart said first and second spider means; a disk member slidably and rotatably mounted along the length of said input member being adapted to impart its sliding motion to said output member; and means operatively connecting said disk member to said second spider means for both sliding and rotational movement therewith.

4. The apparatus of claim 1 wherein said effective angle is adjustable from 45° to 90°.

5. The apparatus of claim 1 wherein said effective angle defined by said legs is less than 90°.

6. The apparatus of claim 1 wherein said effective angle is selected to enable the angular rotation of said drum to be closely proportional to the rotational speed of the shaft.

7. The apparatus of claim 1 wherein said effective angle is selected to compensate for the deviation from proportionality of the degree of movement of said output member to the rotational speed of the shaft.

8. The apparatus of claim 1 wherein the effective length of one of said legs is adjustable.

9. The apparatus of claim 8 wherein the effective length of said operatively bearing leg is adjustable.

10. The apparatus of claim 1 additionally including means for biasing said operatively bearing leg to bear on said output member.

11. Apparatus for deflecting a pointer in proportion to the rotational speed of a shaft comprising:
    (A) a support;

(B) governor means mounted on said support including an input member adapted to be operatively connected to the shaft for rotation therewith and an output member movable in a given direction to a degree generally related to the rotational speed of the shaft; said governor means comprising first and second spider means, said first spider means being fixedly mounted on and operatively connected to said input member for rotation therewith, said second spider means being both slidably and rotatably mounted along the length of said input member on one side of said first spider means; weights operatively connecting said second spider means to said first spider means for rotation therewith; spring means biasing apart said first and second spider means; a disk member slidably and rotatably mounted along the length of said input member on the other side of said first spider means, said disk member being adapted to impart its sliding motion to said output member; and means operatively connecting said disk member to said second spider means for both sliding and rotational movement therewith;

(C) indicator means including a drum rotatably mounted on said support, a pointer operatively connected to said drum for movement therewith, and a flexible member at least partially wound about said drum, said drum being rotated by the unwinding of said flexible member therefrom; and (D) an angled lever pivotably mounted on said support with one leg operatively bearing on said output member for motion therewith and the other leg secured to a portion of said flexible member for unwinding said flexible member from said drum.

12. The apparatus of claim 11 wherein said drum has an irregular peripheral contour configured and dimensioned so that the degree of rotation of said drum is closely proporational to the rotational speed of the shaft.

13. The apparatus of claim 11 wherein said flexible member comprises an axially reinforced plastic strip.

14. The apparatus of claim 11 wherein the effective angle defined by said legs is adjustable.

15. The apparatus of claim 14 wherein said angle is adjustable from 45° to 90°.

16. The apparatus of claim 14 wherein said angle is selected to compensate for the deviation from proportionality of the degree of movement of said output member to the rotational speed of the shaft.

17. The apparatus of claim 14 wherein the effective length of one of said legs is adjustable.

18. The apparatus of claim 17 wherein the effective length of said operatively bearing leg is adjustable.

19. The apparatus of claim 11 wherein the effective angle defined by said legs is less than 90°.

20. The apparatus of claim 19 wherein said angle is selected to enable the angular rotation of said drum to be closely proportional to the rotational speed of the shaft.

21. The apparatus of claim 11 additionally including means for biasing said operatively bearing leg to bear on said output member.

22. Apparatus for deflecting a pointer in proportion to the magnitude of a physical variable comprising:

(A) a support;

(B) a responsive member mounted on said support and movable along a given axis to a degree generally related to the magnitude of a physical variable;

(C) indicator means including a drum rotatably mounted on said support, a pointer operatively connected to said drum for movement therewith, and a flexible member at least partially wound about said drum, said drum being rotated by the unwinding of said flexible member therefrom;

(D) means operatively connecting said responsive member and said flexible member, said connecting means comprising an angled lever having a vertex pivotally mounted on said support with one leg operatively bearing on said responsive member for motion therewith along said given axis and the other leg secured to a portion of said flexible member for unwinding said flexible member from said drum, the effective angle formed by said legs being fixed during normal operation of said apparatus; and (E) means for compensating for the deviation from linear proportionality of the degree of movement of said responsive member to the magnitude of said physical variable, said compensating means comprising means for adjusting said effective angle formed by said legs prior to normal operation of said apparatus, whereby the movement of said flexible member is closely proportional to the magnitude of the physical variable during normal operation of said apparatus.

23. The apparatus of claim 22 wherein said flexible member comprises an axially reinforced plastic strip.

24. The apparatus of claim 22 wherein said governor means comprises first and second spider means, said first spider means being fixedly mounted on and operatively connected to said input member for rotation therewith, said second spider means being both slidably and rotatably mounted along the length of said input member on one side of said first spider means; weights operatively connecting said second spider means to said first spider means for rotation therewith; spring means biasing apart said first and second spider means; a disk member slidably and rotatably mounted along the length of said input member on the other side of said first spider means, said disk member being adapted to imparts its sliding motion to said output member; and means operatively connecting said disk member to said second spider means for both sliding and rotational movement therewith.

25. The apparatus of claim 22 wherein said effective angle is adjustable from 45° to 90°.

26. The apparatus of claim 22 wherein said effective angle defined by said legs is less than 90°.

27. The apparatus of claim 22 wherein said effective angle is selected to enable the angular rotation of said drum to be closely proportional to the rotational speed of the shaft.

28. The apparatus of claim 22 wherein said effective angle is selected to compensate for the deviation from proporationality of the degree of movement of said output member to the rotational speed of the shaft.

29. The apparatus of claim 22 wherein the effective length of one of said legs is adjustable.

30. The apparatus of claim 29 wherein the effective length of said operatively bearing leg is adjustable.

31. The apparatus of claim 22 additionally including means for biasing said operatively bearing leg to bear on said output member.

* * * * *

UNITED STATES PATENT OFFICE
CERTIFICATE OF CORRECTION

PATENT NO. : 4,109,533

DATED : August 29, 1978

INVENTOR(S) : RICHARD J. BROADMAN, RICHARD D. MAY

It is certified that error appears in the above-identified patent and that said Letters Patent are hereby corrected as shown below:

Claim 12, line 4, delete "proporational" and insert -- proportional --.

Claim 24, lines 1-2, delete "said governor means comprises" and insert -- the physical variable is the rotational speed of a shaft, said apparatus further comprising governor means mounted on said support including an input member adapted to be operatively connected to the shaft for rotation therewith and an output member movable in a given direction to a degree generally related to the rotational speed of the shaft, said output member comprising said response member, said governor means further comprising --.

Claim 27, lines 3-4, delete "rotation speed of the shaft" and insert -- magnitude of the physical variable --.

Claim 28, line 4, delete "output member to the rotational speed of the shaft" and insert -- responsive member to the magnitude of the physical variable --.

Claim 31, line 3, delete "output" and insert -- responsive --.

Signed and Sealed this

Twenty-ninth Day of May 1979

[SEAL]

Attest:

RUTH C. MASON
Attesting Officer

DONALD W. BANNER
Commissioner of Patents and Trademarks